US012428881B2

(12) United States Patent
Fuchs

(10) Patent No.: US 12,428,881 B2
(45) Date of Patent: Sep. 30, 2025

(54) ELECTRICALLY ACTUATABLE MOTOR VEHICLE LOCK

(71) Applicant: KIEKERT AG, Heiligenhaus (DE)

(72) Inventor: Carsten Fuchs, Essen (DE)

(73) Assignee: Kiekert AG, Heiligenhaus (DE)

( * ) Notice: Subject to any disclaimer, the term of this patent is extended or adjusted under 35 U.S.C. 154(b) by 319 days.

(21) Appl. No.: 17/799,032

(22) PCT Filed: Jan. 14, 2021

(86) PCT No.: PCT/DE2021/100038
§ 371 (c)(1),
(2) Date: Aug. 11, 2022

(87) PCT Pub. No.: WO2021/151423
PCT Pub. Date: Aug. 5, 2021

(65) Prior Publication Data
US 2023/0074045 A1 Mar. 9, 2023

(30) Foreign Application Priority Data
Jan. 29, 2020 (DE) ..................... 10 2020 102 073.2

(51) Int. Cl.
*E05B 81/14* (2014.01)
*E05B 79/20* (2014.01)
(Continued)

(52) U.S. Cl.
CPC .............. *E05B 81/14* (2013.01); *E05B 79/20* (2013.01); *E05B 81/06* (2013.01); *E05B 81/30* (2013.01); *E05B 81/34* (2013.01); *E05B 81/90* (2013.01)

(58) Field of Classification Search
CPC .......... E05B 81/14; E05B 81/06; E05B 81/30; E05B 81/34; E05B 81/90; E05B 79/20
(Continued)

(56) References Cited

U.S. PATENT DOCUMENTS 10,378,252 B2 * 8/2019 Ottino ..................... E05B 81/68
10,844,639 B2 * 11/2020 Nelsen .................... E05B 81/90
(Continued)

FOREIGN PATENT DOCUMENTS

DE 102017124525 A1 4/2019
DE 102017124531 A1 4/2019
(Continued)

OTHER PUBLICATIONS

International Search Report mailed Mar. 29, 2021, for priority International Patent Application No. PCT/DE2021/100038.

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

An electrically actuatable motor vehicle lock comprising: a locking mechanism with a rotary latch and at least one pawl, a release lever, the release lever interacting with the locking mechanism in such a way that a locked locking mechanism can be unlocked, an electric drive unit, the release lever being actuatable at least by means of the drive unit and the drive unit having at least one control element for actuating the release lever, and the motor vehicle lock having a means for manually resetting the actuated release lever.

14 Claims, 1 Drawing Sheet

(51) Int. Cl.
*E05B 81/06* (2014.01)
*E05B 81/30* (2014.01)
*E05B 81/34* (2014.01)
*E05B 81/90* (2014.01)

(58) Field of Classification Search
USPC .......................................................... 70/278.7
See application file for complete search history.

(56) References Cited

U.S. PATENT DOCUMENTS

| | | | | |
|---|---|---|---|---|
| 11,377,883 | B2 * | 7/2022 | Taurasi | E05B 81/16 |
| 2013/0300133 | A1 * | 11/2013 | Margheritti | E05B 77/16<br>292/96 |
| 2017/0159331 | A1 * | 6/2017 | Handke | E05B 81/16 |
| 2019/0226246 | A1 * | 7/2019 | Schiffer | E05B 81/14 |

FOREIGN PATENT DOCUMENTS

| | | | | |
|---|---|---|---|---|
| DE | 102018110700 | A1 | 11/2019 | |
| EP | 1320652 | B1 * | 11/2005 | E05B 77/12 |
| WO | 2019068277 | A1 | 4/2019 | |
| WO | WO-2019076403 | A1 * | 4/2019 | E05B 81/06 |

* cited by examiner

ELECTRICALLY ACTUATABLE MOTOR VEHICLE LOCK

This application is a national phase of International Patent Application No. PCT/DE2021/100038 filed Jan. 14, 2021, which claims priority to German Patent Application No. 10 2020 102 073.2 filed Jan. 29, 2020, each of which is hereby incorporated herein by reference in its entirety.

FIELD OF DISCLOSURE

The invention relates to an electrically actuatable motor vehicle lock comprising a locking mechanism having a rotary latch and at least one pawl, a release lever, the release lever interacting with the locking mechanism in such a way that a locked locking mechanism can be unlocked, an electric drive unit, the release lever being actuatable at least by means of the drive unit, and the drive unit having at least one control element for actuating the release lever.

BACKGROUND OF DISCLOSURE

Motor vehicle door locks having an electric drive for releasing the locking mechanism are known in practice in a variety of designs. The electric drive ensures that a control element is moved, by means of which the release lever is actuated and the locking mechanism is thus unlocked. In addition, in most cases the locking mechanism can basically also be opened mechanically. This can take place, for example, via an internal actuating lever. In contrast, a sensor that is usually acted upon by the external door handle ensures that the electric drive is activated. It is also quite common in practice that a sensor arranged in the region of the external door handle or in the external door handle itself only has to be initialized in order to put the electric drive into operation.

However, in the case of electric drives and, in particular, opening drives for the locking mechanism and the interposed actuating lever chain between the electric drive in question and the locking mechanism, there is the problem that the drive can no longer be brought into its normal position, for example after an electrical opening process. This may include a failure of the electric power supply of the electric drive. Alternatively or additionally, however, it is also possible that the actuating lever chain is simply mechanically difficult to move and/or blocked.

In the cases mentioned, this means that the pawl remains in the raised position with the help of the actuating lever chain or a release lever as a component of same. The rotary latch is open and the locking mechanism cannot be closed because the pawl, due to its raised position, is not able to fall into the rotary latch during the closing process.

An emergency opening operation is described in EP 1 320 652 B2. This emergency opening operation is executed depending on a signal from a sensor. The sensor can be an airbag sensor that emits a signal in the event of an accident. As a result of this, the electric drive in the known teaching not only acts on the locking mechanism to open it electrically, but also connects an external door handle to the locking mechanism in order to implement an emergency opening. For this purpose, an intermediate lever that can be controlled by the electric drive is provided, which intermediate lever couples a release lever that can be acted upon by the external actuating lever to the pawl. The intermediate lever in question can also be transferred into the position coupling the release lever to the pawl with the help of a manually actuable emergency actuation element in the form of a lock cylinder or a comparable mechanical adjustment device.

DE 10 2017 124 531 A1 also discloses the possibility of an emergency operation in which the deflected release lever can be returned to its starting position in the event of a power failure. In order to be able to return the release lever in the unlocked position, an emergency actuation element is provided that uncouples the actuating lever chain, such that the release lever can be moved into its starting position, i.e., the position in which the release lever releases the pawl, by means of spring force. The emergency actuation element is arranged in the motor vehicle lock in such a way that it can be acted upon manually, a coupling lever decoupling the release lever designed in two parts.

The state of the art provides approaches to the effect that the actuating lever chain is to be decoupled in the event of a power failure, it also being possible to close the locking mechanism with the help of an emergency actuation element that can be acted upon manually. The solutions are all linked to additional mechanisms and require, at least in some areas, electrical resetting of the actuating lever chain in order to return the locking mechanism to its starting position. This is the starting point for the invention.

SUMMARY OF DISCLOSURE

Proceeding from the known state of the art, the object is to provide an improved motor vehicle lock. In particular, the object is to provide a simplified motor vehicle lock having a smaller number of components in order to allow emergency locking with the least possible effort and taking into account a structurally simple design and manual actuation.

The object is achieved according to the invention by the features of the independent claim. Advantageous embodiments of the invention are specified in the dependent claims. It should be noted that the exemplary embodiments described below are not restrictive; rather, any possible variations of the features described in the description, the dependent claims and the drawings are possible.

According to claim 1, the object of the invention is achieved in that an electrically actuatable motor vehicle lock is provided, which comprises a locking mechanism having a rotary latch and at least one pawl, a release lever, the release lever interacting with the locking mechanism in such a way that a locked locking mechanism can be unlocked, an electric drive unit, the release lever being actuatable at least by means of the drive unit and the drive unit having at least one control element for actuating the release lever, and the motor vehicle lock having a means for manually resetting the actuated release lever or the actuated drive unit, in particular a gear mechanism. The design according to the invention of the electrically actuatable motor vehicle lock now makes it possible to directly manually move the actuating lever chain and in particular the electric drive unit back into their starting position. Due to the direct intervention on the actuating chain for moving the release lever, additional components can be dispensed with, such that a means for resetting the electric drive unit is provided with a minimum number of components and is therefore structurally favorable and cost-effective. The means for manual resetting acts on the drive train or on the release lever in such a way that the entire actuating chain is returned to its starting position.

If the term "electrically actuatable motor vehicle lock" is used in the context of the invention, it also refers to locks that are used in doors, sliding doors, flaps, and/or covers in the motor vehicle, wherever components that are pivotably or slidably attached to the motor vehicle have to be held securely in their position. The electrically actuatable motor vehicle lock according to the invention preferably relates to a side door lock. If a motor vehicle lock is referred to below, synonyms such as latching device or door lock are equivalent to one another. Motor vehicle locks of this type comprise a locking mechanism consisting of a rotary latch and a pawl.

The locking mechanism can also be equipped with two or more pawls or, for example, have a ratchet lever or blocking lever. A first ratchet pawl, which is also referred to as a comfort pawl, is directly engaged with the rotary latch. Depending on the design of the locking mechanism, a pre-ratchet and/or a main ratchet can be implemented in the locking mechanism. If there is an opening moment in the main ratchet position, i.e., the pawl is pushed into an opening position due to the force of the rotary latch, a second pawl is used that can also be described as a ratchet lever or blocking lever. The second pawl secures the first pawl in its main ratchet position. In the case of a two-pawl locking mechanism, the release lever acts on the second pawl or the first and second pawl. The release lever interacts with the pawl or pawls in such a way that the rotary latch is released and a lock holder that is held, for example, is released. In the release position, the pawl or pawls is/are held out of engagement with the rotary latch. Precisely in this case, in which the pawl is held out of engagement with the rotary latch, the electrical power supply can fail, such that the locking mechanism cannot be locked again. According to the invention, the release lever can now be reset manually.

The drive unit has an electric motor, in particular an electric direct current motor, on the output shaft of which a gearwheel is arranged that preferably interacts with an output wheel. Gear transmissions are preferably used here, the invention not being limited to, for example, a worm gear. Rather, it is conceivable that other types of gear mechanisms, such as a toothed rack, can also be moved by means of the electric drive. A control element can be moved by means of the motor gear unit, it also being possible for the control element to be part of the gear mechanism. The control element is preferably designed as a separate component and is driven by means of a gear stage. In this case, the release lever is moved, preferably pivoted, by means of the control element. The failure of the electrical power supply acts in such a way that the motor gear unit can prevent the release lever from being reset. In addition, for example, a difficulty in movement of the motor gear unit and/or the control element and/or the release lever can prevent the release lever from being reset. The components of the drive chain for the release lever are preferably spring-loaded, such that resetting is performed in a spring-supported manner. In particular, the pawl or pawls are accommodated in the motor vehicle lock in a spring-loaded manner, such that resetting of the release lever can be supported. The release lever, as well as the control element, can also be accommodated in the motor vehicle lock in a spring-supported manner.

A further embodiment variant of the invention results when the control element can be actuated, in particular pivoted, by means of the means for resetting. The control element is part of the electric drive unit and can be designed as a one-piece component together with an output wheel of a gear stage. The control element is preferably accommodated as a separate component in the motor vehicle lock and is preferably pivotably mounted in the motor vehicle lock. In the preferred embodiment, the drive unit and consequently the actuating chain for the release lever thus consist of the electric motor, a drive gearwheel attached to the output shaft, an output wheel meshing with the drive gearwheel, and the control element. The output wheel and the control element can be in engagement with one another via a further toothing and thus a further gear stage. Consequently, if the drive motor is energized, the control element is driven and pivoted via two gear stages. This offers the advantage that the force that is introduced into the control element can be adjusted to the forces in the locking mechanism or the forces that are to be provided in the release lever. If, for example, a two-pawl locking mechanism is used, the release forces that act on the second pawl are significantly lower than when a single-pawl locking mechanism is used, the pawl having to be moved out of a ratchet position and out of engagement with the rotary latch. The pivoting or the rotatable or pivotable mounting of the control element offers a structurally favorable way to actuate the release lever. If the means for resetting now acts directly on the control element, the drive chain can be completely reset. Actuation of the control element in this case acts on the electric motor and at the same time on the release lever via the gear stages. The release lever and/or the pawls can be spring-loaded, such that when the control element is reset, the pawl and the release lever move back automatically. However, it is also conceivable that the control element is engaged with the release lever in a form-fitting manner, such that the release lever can be returned.

In a further embodiment variant, the release lever can be actuated, in particular pivoted, by means of the means for resetting. The release lever is preferably actuated electrically in that the drive chain is electrically energized and the electric motor moves the control element in such a way that the release lever is moved. The release lever acts directly on the locking mechanism and unlocks the locking mechanism, as described above. Depending on the embodiment of the locking mechanism, the release lever can also be actuated manually, for example via an outside door handle or an inside door handle. For this purpose, the release lever can engage with an actuating lever. If the means for resetting is attached directly to the release lever, the release lever itself can be reset manually if the ratchet lever or blocking lever and/or a pawl is deflected. Thus, the locking mechanism can be locked again and emergency locking is made possible. However, it is also conceivable for the release lever to interact with the control element in a form-fitting manner, such that when the release lever is reset, the control element or control element and the gear stages can be reset. The pivotable mounting of the release lever offers the advantage of a compact design and a favorable possibility to introduce forces and/or moments into the locking mechanism.

If the means for resetting is designed as an actuating nut, this results in a further embodiment variant of the invention. Mechanical engagement means that can introduce mechanical actuation into the motor vehicle lock by means of rotating are generally known as actuating nuts. These actuating nuts preferably have engagement contours that can be designed, for example, as slots or as squares or hexagons. The engagement openings are preferably designed in the form of slots, such that an operator can insert a key or a screwdriver into the slot, for example, in order to actuate the actuating nut, which can also be called a switch nut. When the motor vehicle lock is installed, the actuating nut is accessible from an inner surface, for example in the region of the B pillar. By rotating or moving the actuating nut, the drive unit, the control element or the release lever can be mechanically reset directly or indirectly. For this purpose, a lever mechanism and/or an additional gear mechanism unit can be connected to the actuating nut in order to return the release lever to its starting position.

The actuating nut is preferably arranged in the region of the inlet mouth of the motor vehicle lock, which results in an advantageous embodiment variant of the invention. The inlet mouth is the region of the motor vehicle lock through which the motor vehicle lock interacts with a lock holder. When the motor vehicle lock is in the open state, the rotary latch substantially releases the inlet mouth, such that the lock holder can access the rotary latch. The arrangement of the actuating nut in the region of the inlet mouth thus advantageously provides access to the motor vehicle lock without having to arrange further openings in the motor vehicle for actuating the actuating nut.

If the means for resetting is designed as an extension, in particular as a lever-like extension, on the control element or on the release lever, this results in a further embodiment variant of the invention. The direct extension of the components of the motor vehicle lock, such as the control element or release lever, offers the advantage that existing components of the motor vehicle lock can be used. By simply extending the components, the number of components required can be reduced to a minimum. It is also conceivable that the extension forms a means of manual engagement for the user of the motor vehicle. The extension can protrude from the motor vehicle lock, for example, and can be gripped and actuated manually by the operator. Thus, emergency actuation, i.e., resetting of the release lever, can take place directly by actuating the control element or the release lever. After the extension has been actuated, the release lever is again in its starting position, such that the pawl can be brought back into engagement with the rotary latch in a spring-driven manner.

It can also be advantageous if the means for resetting can be actuated indirectly, in particular via a flexible actuation element. A flexible actuation means can be, for example, a Bowden cable or a pull cable that the operator can grasp and pull or press for emergency actuation. The use of a flexible actuation element makes it possible to arrange the emergency actuation at a distance from the motor vehicle lock, such that an advantageous arrangement of the emergency actuation in the motor vehicle lock that is clearly visible to the operator can be formed.

The design according to the invention of the motor vehicle lock now makes it possible, in the event of a power failure and when the pawl is deflected, to reset the electric drive and the release lever, such that the motor vehicle lock can be locked again. Even if it is not explained further in the examples, there is of course also the possibility of arranging a means for resetting and, for example, an extension on the pawl itself in order to be able to reset the release lever and the drive unit.

BRIEF DESCRIPTION OF DRAWINGS

In the following, the invention is explained in more detail with reference to the appended drawings using various exemplary embodiments. However, the principle applies that the exemplary embodiment does not limit the invention, but is merely an advantageous embodiment. The features shown can be implemented individually or in combination with further features of the description as well as the claims, individually or in combination.

In the drawings.

DETAILED DESCRIPTION

Figure 1:
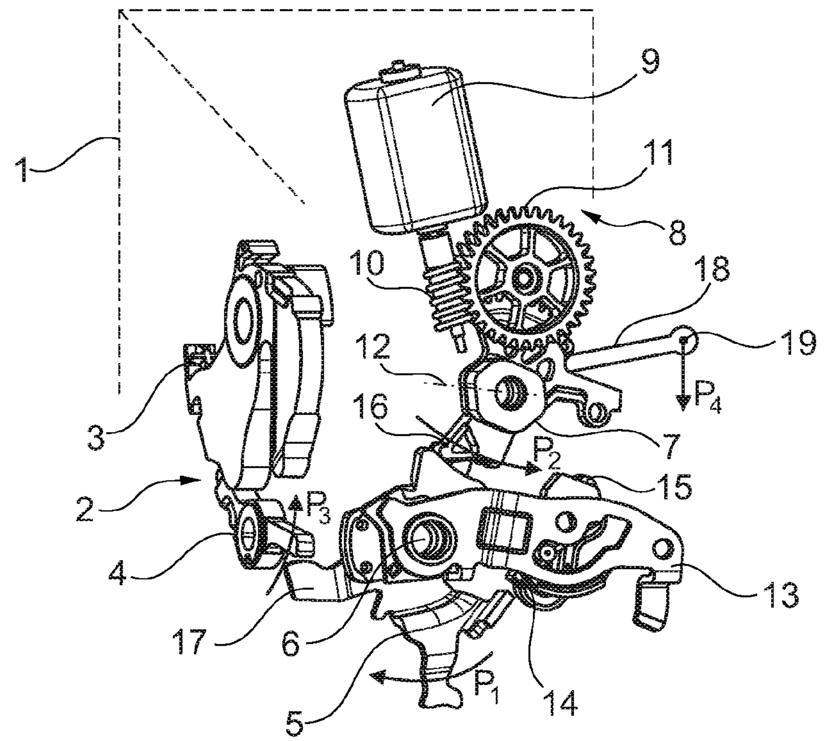
FIG. 1 is a three-dimensional view of a motor vehicle lock, only the components that are essential for explaining the invention being shown.

FIG. 1 is a three-dimensional view of a motor vehicle lock 1, only the components necessary for explaining the invention being shown. A locking mechanism 2 having a rotary latch 3 and a pawl 4 that are accommodated, for example, pivotably in a lock plate (not shown) of the motor vehicle lock 1 is shown. The locking mechanism 2 is shown in a main ratchet position, in which the pawl 4 blocks the rotational movement of the rotary latch, such that a lock holder (also not shown) can be fixed.

The pawl 4 can interact with the pawl 4 by means of a release lever 5 and, in particular, by means of a pivoting movement of the release lever 5 in the direction of the arrow P1, and can release the pawl 4 from engagement with the rotary latch 3.

For this purpose, the release lever 5 is accommodated in the motor vehicle lock 1 such that it can pivot about the axis 6. A control element 7 interacts with the release lever 5, the control element 7 being part of a drive unit 8 for actuating the release lever 5. The drive unit 8 has an electric motor 9, a drive wheel 10, an output wheel 11 and the control element 7. A first gear stage is formed by the drive wheel 10 and the output wheel 11 and a second gear stage is formed by the output wheel 11 and the control element 7. The first gear stage 10, 11 can be driven by means of the electric motor 9, as a result of which the control element 7 can in turn be pivoted about the axis 12.

In addition, FIG. 1 shows an actuating lever 13, which is an external actuating lever 13, for example. The release lever 5 can also be pivoted in the direction of the arrow P1 by means of the actuating lever 13 and in particular by means of a coupling element 14, such that the locking mechanism 2 can be unlocked. The illustrated exemplary embodiment shows an actuating lever 14 that actuates the release lever 5 by means of a coupling lever 14 and with the help of a control lever 15. The locking mechanism 2 can be unlocked manually by means of the external actuating lever 13. In a motor vehicle lock 1 that can be actuated purely electrically, manual unlocking of the locking mechanism 2 is only necessary if mechanical unlocking of the locking mechanism 2 is required.

If the drive unit 8 and, in particular, the electric motor 9 is now energized, the control element 7 is pivoted in the direction of the arrow P2 by means of the first and second gear stages. A control cam 16 engages in the release lever 5 and pivots the release lever in the direction of the arrow P1. An actuation end 17 of the release lever 5 thus comes into engagement with the pawl 4, the pawl 4 being pivoted in the direction of the arrow P3. The pawl 4 disengages from the rotary latch 3, such that a lock holder held by means of the rotary latch 3 is released. The motor vehicle lock is now open. If, in this state of the motor vehicle lock 1, the electrical power supply fails, the locking mechanism 2 cannot be locked again. Electromechanical resetting of the drive unit 8 cannot be carried out. In this case, means for resetting 18 are provided in the motor vehicle lock 1, an extension 18 on the control element 7 being shown as an example. By means of the extension 18, the control element 7 can be manually pivoted in a clockwise direction about the axis 12. For this purpose, for example, a Bowden cable can engage in an engagement contour 19 of the extension 18 and pivot the control element 7 or reset it manually.

Figure 2:
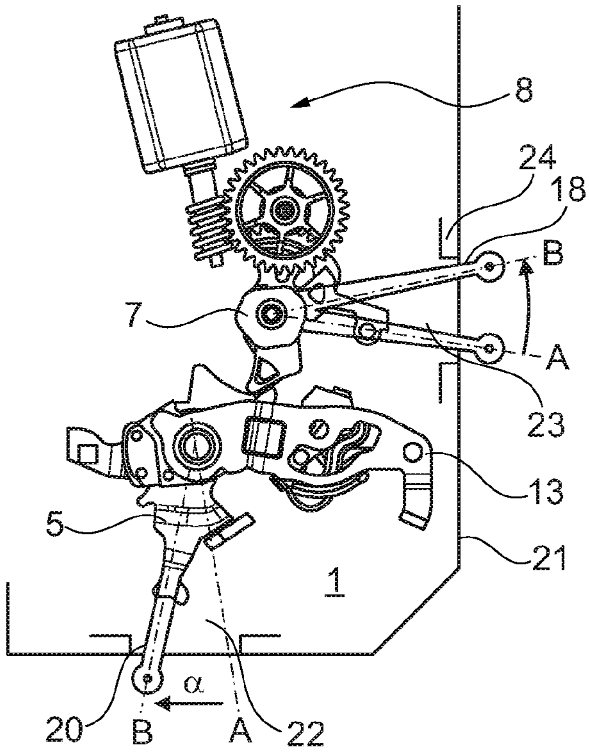
FIG. 2 is a side view of the drive unit, the actuation mechanism and the release lever.

FIG. 2 is a view of the drive unit 8, the actuating lever 13 and the release lever 5, the position of the release lever 5 being shown in which the release lever 5 has unlocked the locking mechanism 2. To unlock the locking mechanism 2, the release lever 5 was pivoted from a starting position A into an actuation position B by the angle α. The extension 20 formed on the release lever 5 preferably protrudes from the housing 21 of the motor vehicle lock 1, such that the extension 2 can be gripped manually. For this purpose, the housing 21 can have an opening 22 through which the means for resetting 20 extends. The extension 20 is connected to and shown on the release lever 5 only by way of example; the connection of an extension 18 to the control element 7 is also conceivable and shown in FIG. 2. The state in which the motor vehicle lock 1 is unlocked is shown. If there is a power failure in this state, the locking mechanism 2 cannot be locked again. By means of the extensions 18, 20, the control element 7 and the release lever 5 can now be manually returned to the starting position A after the release lever 5 has been actuated. For this purpose, the extension 18, 20 can either be gripped manually or pulling or actuating means are present in order to return the extension 18 back into the starting position. The extensions 18, 20 pass through an opening 22, 23, the ends of the openings 22, 23 serving as stops 24 for the extension 18, 20. For the sake of clarity in FIG. 2, only one stop 24 is provided with a reference sign.

If the control element 7 is returned to the starting position by means of the extension 18, a form-fitting engagement between the control element 7 and the release lever 5 can be provided, such that the release lever 5 is returned mechanically and in a forcibly guided manner. However, it is also conceivable that, after the control element 7 has been reset, the release lever 5 and the pawl 4 are reset by means of a spring provided on the release lever and/or on the pawl. After the release lever 5 has been reset manually, the locking mechanism 2 can be locked, such that the motor vehicle lock can be locked even in the event of a power failure.

LIST OF REFERENCE SIGNS

- 1 motor vehicle lock
- 2 locking mechanism
- 3 rotary latch
- 4 pawl
- 5 release lever
- 6, 12 axis
- 7 control element
- 8 drive unit
- 9 electric motor
- 10 drive wheel
- 11 output wheel
- 13 actuating lever
- 14 coupling lever
- 15 control lever
- 16 control cam
- 17 actuation end
- 18, 20 means for resetting, extension
- 19 engagement contour
- 21 housing
- 22, 23 opening
- 24 stop
- P1, P2, P3, P4 arrow
- A starting position
- B actuation position
- α angle

The invention claimed is:

1. An electrically actuatable motor vehicle lock comprising:

a locking mechanism having a rotary latch and at least one pawl, a release lever, the release lever interacting with the at least one pawl in such a way that the locking mechanism can be locked or unlocked, an electric drive unit, the release lever being actuatable by the electric drive unit, and the electric drive unit having a control element for actuating the release lever from a starting position to an actuation position, wherein the starting position is a position of the release lever when the locking mechanism is in a locked state, and wherein the actuation position is a position of the release lever when the locking mechanism is in an unlocked state, and a means for manually resetting the release lever from the actuation position to the starting position after the release lever has been actuated, wherein the means for manually resetting comprises a lever extension formed on the control element configured to travel with the control element as the electric drive unit drives the control element, wherein the lever extension is further configured for manual actuation to pivot the control element, and wherein the release lever is spring biased toward the starting position.

2. The motor vehicle lock according to claim 1, wherein the release lever is actuated by the means for resetting pivoting the release lever.

3. The motor vehicle lock according to claim 1, wherein the means for resetting includes an actuating nut.

4. The motor vehicle lock according to claim 3, wherein the actuating nut is arranged in a region of an inlet mouth of the motor vehicle lock.

5. The motor vehicle lock according to claim 1, wherein the lever extension has an engagement contour.

6. The motor vehicle lock according to claim 1, wherein the means for resetting is indirectly actuatable by a flexible actuation element.

7. The motor vehicle lock according to claim 1, wherein the control element engages with the release lever in a form-fitting manner.

8. The motor vehicle lock according to claim 1, wherein the control element is designed as a separate component in the motor vehicle lock.

9. The motor vehicle lock according to claim 1, wherein the electric drive unit includes a gear stage that drives the control element.

10. The motor vehicle lock according to claim 9, wherein the gear stage includes an output wheel having toothing that engages with toothing of the control element.

11. The motor vehicle lock according to claim 6, wherein the flexible actuation element is a Bowden cable.

12. The motor vehicle lock according to claim 1, further comprising a housing having an opening, and the means for resetting the release lever extends through the opening of the housing.

13. The motor vehicle lock according to claim 1, wherein the means for resetting the release lever is configured to manually reset the release lever in the event of failure of the electric drive unit.

14. The motor vehicle lock according to claim 12, wherein the means for resetting the release lever comprises a lever extension that passes through an opening in the housing, and wherein ends of the opening serve as stops for rotation of the lever extension.

* * * * *